United States Patent
Muldowney et al.

(10) Patent No.: US 7,074,372 B2
(45) Date of Patent: *Jul. 11, 2006

(54) MULTIPHASE MIXING DEVICE WITH IMPROVED QUENCH INJECTION FOR INDUCING ROTATIONAL FLOW

(75) Inventors: Gregory P. Muldowney, Glen Mills, PA (US); Michael R. Chuba, Wrightstown, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 122 days.

This patent is subject to a terminal disclaimer.

(21) Appl. No.: 10/439,960

(22) Filed: May 16, 2003

(65) Prior Publication Data

US 2004/0234434 A1  Nov. 25, 2004

(51) Int. Cl.
*B01J 8/04* (2006.01)
*B01J 35/02* (2006.01)

(52) U.S. Cl. ............ 422/194; 422/191; 422/195; 422/220; 422/224

(58) Field of Classification Search .......... 422/190, 422/191, 194, 195, 220, 224; 239/558; 261/97
See application file for complete search history.

(56) References Cited

U.S. PATENT DOCUMENTS

| | | | |
|---|---|---|---|
| 3,787,189 A | | 1/1974 | Lovell et al. ............. 23/288 R |
| 4,836,989 A | * | 6/1989 | Aly et al. .................. 422/195 |
| 4,960,571 A | * | 10/1990 | Bhagat et al. ............. 422/194 |
| 5,152,967 A | * | 10/1992 | Rossetti et al. ............. 422/194 |
| 5,403,560 A | * | 4/1995 | Deshpande et al. ........ 422/190 |
| 5,462,719 A | * | 10/1995 | Pedersen et al. .......... 422/195 |
| 5,554,346 A | * | 9/1996 | Perry et al. ................ 422/195 |
| 5,567,396 A | * | 10/1996 | Perry et al. ................ 422/190 |
| 5,635,145 A | * | 6/1997 | Den Hartog et al. ...... 422/191 |
| 5,690,896 A | * | 11/1997 | Stangeland et al. ........ 422/191 |
| 5,837,208 A | * | 11/1998 | Grott et al. ................ 422/195 |
| 5,935,413 A | * | 8/1999 | Boyd et al. .................. 208/49 |
| 6,180,068 B1 | * | 1/2001 | Boyd et al. ................ 422/195 |

(Continued)

FOREIGN PATENT DOCUMENTS

EP    0462753    12/1991

(Continued)

OTHER PUBLICATIONS

Co-pending application entitled, "Improved Multiphase Mixing Device with Baffles." (U.S. Appl. No. 10/341,123, filed on Jan. 13, 2003).

(Continued)

*Primary Examiner*—N. Bhat
(74) *Attorney, Agent, or Firm*—Glenn T. Barrett

(57) ABSTRACT

A mixing system is disclosed which provides improved multiphase mixing through the use of a novel quench injection means. The mixing system comprises a horizontal collection tray, a mixing chamber positioned below the collection tray, and at least one passageway extending through the collection tray into the mixing chamber. The mixing chamber and the collection tray define a two-phase mixing volume. The passageway conducts fluid from above the collection tray into the mixing chamber. The mixing chamber preferably includes at least one outlet opening for the downward passage of fluid. In particular, mixing of quench fluid is significantly improved when quench is introduced into a region above the collection tray and where a preferred direction of quench injection is selected to cause a rotational current on the collection tray.

17 Claims, 4 Drawing Sheets

U.S. PATENT DOCUMENTS

| | | | |
|---|---|---|---|
| 6,186,658 B1 * | 2/2001 | Nishida et al. | 366/173.2 |
| 2002/0172632 A1 | 11/2002 | Chou | 422/220 |
| 2004/0037759 A1 * | 2/2004 | Van Vliet et al. | 422/195 |

FOREIGN PATENT DOCUMENTS

| | | | |
|---|---|---|---|
| EP | 0 472 335 A1 | 2/1992 |
| EP | 0 663 236 A1 | 12/1994 |
| EP | 0 716 881 A1 | 6/1995 |

OTHER PUBLICATIONS

Co-pending application entitled, "Multiphase Mixing Device with Improved Quench Injection."

Co-pending application entitled, "Improved Multiphase Mixing Device with Staged Gas Introduction." (U.S. Appl. No. 10/358,760, filed on Feb. 5, 2003).

* cited by examiner

MULTIPHASE MIXING DEVICE WITH IMPROVED QUENCH INJECTION FOR INDUCING ROTATIONAL FLOW

FIELD OF THE INVENTION

The present invention relates generally to systems for mixing process gases and liquids and more specifically to interbed quench and mixing systems involving cocurrent and countercurrent downflow reactors using fixed hardware.

BACKGROUND OF THE INVENTION

Downward flow reactors are used by the chemical and refining industries in a variety of processes, such as hydrotreating, hydrofinishing and hydrocracking. A typical downward flow reactor has a cylindrical outer wall with a catalyst bed positioned within the reactor. The catalyst bed generally rests on a catalyst support grid positioned horizontally within the reactor and spanning the complete diameter of the reactor. The catalyst support grid, together with the outer wall, cooperate to retain the catalyst or other particulate material in place. A distribution tray is positioned horizontally within the reactor at a location above the catalyst bed for evenly distributing process fluids onto the catalyst. The catalyst support grid, outer reactor wall and the distribution tray define the volume of the catalyst bed.

Multiple bed reactors are commonly used. They are formed by providing two or more such catalyst beds spaced along the longitudinal axis of the reactor. The region between successive catalyst beds defines an interbed mixing zone. When a reactor having more than one catalyst bed is used, reactant fluids are introduced into the reactor above the uppermost catalyst bed. The reactant fluids, which typically consist of both liquid and vapor phases, flow through the uppermost catalyst bed.

From the uppermost catalyst bed, unreacted reactant fluids and the related fluid products derived from interaction with the catalyst enter the interbed mixing zone. The interbed mixing zone typically includes a mixing chamber. This interbed mixing zone including a mixing chamber serves several purposes. First, the interbed mixing zone serves as a convenient place through which additional reactants and/or temperature quenching materials can be introduced into the fluid products. In the reactor units described above, heat is released as a result of the reactions between gas and liquid components occurring on the catalyst(s), causing temperature to increase with distance down the bed. In many cases, cool hydrogen-rich gas is introduced between the beds to quench the temperature rise and replenish the hydrogen consumed by the reactions. Secondly, the interbed mixing zone provides a region for mixing the fluid products. Mixing the fluid products prior to reaction in lower catalyst beds ensures more uniform and efficient reactions. In addition, where catalytic reactions are exothermic and temperature control is a critical processing and safety element, mixing of the fluid products within the mixing chamber can be used to eliminate regions of locally high temperature within the fluid products.

The introduction and mixing of quench into the process gas and liquid must be carried out in the interbed space which spans the full vessel diameter, but is often shorter than one vessel radius. Support beams, piping and other obstructions also occupy the interbed region so that unique hardware is required to perform efficient two-phase mixing in what amounts to limited volume.

Poor quench zone performance manifests itself in two ways. First, the quench zone fails to erase lateral temperature differences at the outlet of the preceding bed or, in the worst cases, amplifies them. An effective quench zone should be able to accept process fluids with 50 to 75 degree F. lateral temperature differences or higher and homogenize them sufficiently that differences do not exceed 5 degree F. at the following bed inlet. The second sign of poor performance is that inlet temperature differences following the quench zone increase as the rate of quench gas is raised. This indicates inadequate mixing of cooler gas with the hot process fluids.

Poor quench zone performance limits reactor operation in various ways. When interbed mixing is unable to erase temperature differences, these persist or grow as the process fluids move down the reactor. Hot spots in any bed lead to rapid deactivation of the catalyst in that region which shortens the total reactor cycle length. Product selectivities are typically poorer at higher temperatures; hot regions can cause color, viscosity and other qualities to be off-specification. Also, if the temperature at any point exceeds a certain value (typically 800 to 850 degree F.), the exothermic reactions may become self-accelerating leading to a runaway which can damage the catalyst, the vessel, or downstream equipment. Cognizant of these hazards, refiners operating with poor internal hardware must sacrifice yield or throughput to avoid these temperature limitations. With present day refinery economics dictating that hydroprocessing units operate at feed rates far exceeding design, optimum quench zone design is a valuable low-cost debottleneck.

One important aspect of the overall mixing efficiency of a quench zone is the ability of the system to mix quench fluids with process fluids. The most critical component of quench mixing efficiency is the methodology though which quench fluid is introduced into the system. There have been various improvements in connection with both physical means and operational considerations for introducing quench into the system.

For example, U.S. Pat. No. 5,152,967 discloses a system incorporating an annular mixing box in which rotational flow of the process fluids is created by slotted entrances. Quench fluid is introduced through an annular ring located substantially in the center of the vessel. The ring is fitted with nozzles to direct quench fluid outward along radial paths. Another device, disclosed in U.S. Pat. No. 5,462,719, creates a rotational flow within a mixing box but without significant liquid holdup in the mixing volume. The quench fluid in this design is introduced through a single vertical inlet at the vessel center positioned such that the entering quench impacts a horizontal deflector forcing the quench fluid radially outward.

Other patents which include descriptions of quench introduction techniques include U.S. Pat. No. 5,635,145. In this patent, a swirl device is used to mix gas and several guide channels are used to mix liquid before depositing them on a pre-distribution tray located between the collection tray and the final distributor tray. Quench is introduced through an annular ring located near the outer wall of the vessel with multiple nozzles directing the flow radially inward. Further, in U.S. Pat. No 5,690,896, an interbed mixing system is described in which an annular mixing trough is used to collect and mix liquid on the collection tray. Gas mixing and further liquid mixing are accomplished in a centrally located mixing box in which the fluids flow in a spiral path towards a central opening in the collection tray. Quench is introduced within the liquid phase through two radially outward oriented nozzles located in the annular mixing trough.

While the above mentioned systems may provide significant improvements in process fluid mixing efficiency, they do suffer from less than ideal quench mixing efficiency. For example, the '967 patent and the '719 patent described above both restrict the process flow through at least one opening passing through the collection tray wherein such openings are substantially in the center of the vessel, and also introduce quench in the space above the center of the tray. As a result, in these designs, quench is injected into a region of the vessel where very high transverse velocities are anticipated. As will be discussed below with respect to the present invention, this configuration results in relatively less efficient quench gas mixing.

The '145 patent also forces flow through a central opening in the collection tray, but locates the quench injection means substantially near the wall of the vessel with multiple nozzles directing quench radially inward. In this design, quench may be suitably located in low-velocity region as it is with the present invention, however, the quench fluid does not enter the vessel flowing counter to the transverse velocity of the process fluid and, as such, does not promote mixing between the process and quench fluids. In this design, it is also believed that the quench location may be located too closely to the wall of the vessel, leaving inadequate mixing volume between the injection point and the wall.

The '896 patent again forces flow through the central opening in the collection tray, but flow is forced to follow a roughly spiral path to the opening as a result of baffles placed on the tray. Quench is injected in two locations on the tray separated by 180 degrees. It is believed that at most one of the quench injectors in this design lies within a low-velocity region beneficial to mixing efficiency. Further, the quench injectors in this system direct fluid radially outward, perpendicular to the transverse velocity of the process fluid rather than opposite the transverse velocity of the process fluid.

Another system, disclosed in U.S. Pat. No. 6,180,068, also provides enhanced mixing of quench gas and process fluids within the interbed space. This system employs separate mixing zones for each of two reactants permitting flexibility in mixing conditions while minimizing pressure drop as well as space and volume requirements. However, the efficiency of this device is sensitive to the degree of phase segregation achieved at the interbed inlet and thus may not perform as desired under all conditions and with respect to particular reactant characteristics.

The above and other known mixing systems generally suffer from the fact that there is insufficient space within the mixing chamber to promote intense two-phase mixing. This limits the capability of these systems to homogenize quench fluid with process fluids and to erase temperature differences between fluids from different sections of the reactor. Accordingly, there is a continued need to provide mixing systems that promote intense two-phase mixing. A preferred system also should provide sufficient volume for the vapor phase to mix separately from the liquid phase. Even while satisfying the above criteria, it is preferable that the designated mixing system minimizes the pressure drop within the reactor as well as permitting relatively easy retrofit with existing reactor spatial constraints.

While various improvements have been made, it will be understood that the prior art systems described above all ultimately depend on a swirl chamber of some form for the critical mixing steps, and the overall mixing performance is directly related to the rotational momentum which is created within this chamber. Most if not all of the prior art systems employ some type of tangentially-directed or helical baffles, surfaces or ramps to introduce one or both phases into the swirl chamber and it is these baffles, surfaces or ramps which change the flow direction from an approximately radial trajectory to the circular motion desired within the mixing chamber.

Notwithstanding this, most prior art systems employ quench injectors which create a substantially radial component alone in the quench fluid, either radially inward or radially outward. Even in systems which include baffles which are claimed to provide premixing of quench and process gases, a rotational component is not introduced until the fluids enter the principal mixing chamber.

The assignee of the present invention has filed a co-pending patent application, U.S. Application Ser. No. 10/439,963, filed May 16, 2003, entitled "MULTIPHASE MIXING DEVICE WITH IMPROVED QUENCH INJECTION." The quench introduction means according to the invention disclosed therein provides for a preferred range of locations within the horizontal cross-section of a vessel for quench fluid injection on a fluid collection tray relative to the wall and to the process fluid outlets through the collection tray. In addition, the invention teaches a quench injection methodology and apparatus calling for a preferred direction of injection so as to release quench into a low-velocity region within the vessel. While the disclosed process and apparatus represent a significant improvement in the art, the system described in the co-pending application does not employ quench injection with a rotational component and does not, therefore benefit from the results attained therewith. Further, the teachings provided in applicant's co-pending application entitled "MULTIPHASE MIXING DEVICE WITH IMPROVED QUENCH INJECTION" may be combined with the teachings contained herein for further improvements and synergies.

As can generally be surmised from the above discussion, there is room in the current art to further mixing efficiencies and performance with respect to the mixing of quench fluid with process fluids in downflow reactors.

SUMMARY OF THE INVENTION

The present invention provides a novel means to provide more effective mixing of quench fluids and process fluids within a reactor vessel. According to the teachings of the present invention, one or more quench injection means are selected to define one or more associated quench injection locations in the region above the principal mixing box or chamber. According to the teachings of the present invention, a preferred direction of quench injection is selected to cause a rotational current on the collection tray in the horizontal plane. This current, in turn, results in a fluid mixing mechanism which is highly complementary to the rotational flows subsequently induced in the principal mixing chamber of the quench zone.

According to the teachings of the present invention, a mixing system is described with such mixing system comprising a horizontal collection tray, a mixing chamber positioned below the collection tray, and at least one passageway extending through the collection tray into the mixing chamber. The mixing chamber and the collection tray define a two-phase mixing volume. The passageway conducts fluid from above the collection tray into the mixing chamber. The mixing chamber preferably includes at least one outlet opening for the downward passage of fluid. The introduction of one or more baffles within the mixing chamber as described in applicant's co-pending application entitled "IMPROVED MULTIPHASE MIXING DEVICE WITH BAFFLES" (application Ser. No. 10/341,123, filed on Jan. 13, 2003) may optionally be implemented in accordance with the mixing system described herein so as to obtain the benefits described in that patent application.

In addition, the teachings described in applicant's copending application entitled "MULTIPHASE MIXING DEVICE WITH IMPROVED QUENCH INJECTION" may generally be combined with the teachings herein. As a result of injecting quench at the specific locations and in the specific directions dictated by the teachings of the copending application, significant improvements in mixing efficiency are obtained. Those teachings may be combined with the teachings designed to induce rotational flow contained herein. In particular, a combination of the teachings allows for mixing of quench fluid to be significantly improved when quench is introduced into a region above the collection tray and where (i) lateral velocities of the process fluids are low, (ii) sufficient volume is available for the quench fluid to mix with the process fluids, and (iii) quench injection occurs so as to induce a rotational flow in the horizontal plane with a significant angular velocity component.

DETAILED DESCRIPTION OF THE INVENTION

Figure 1:
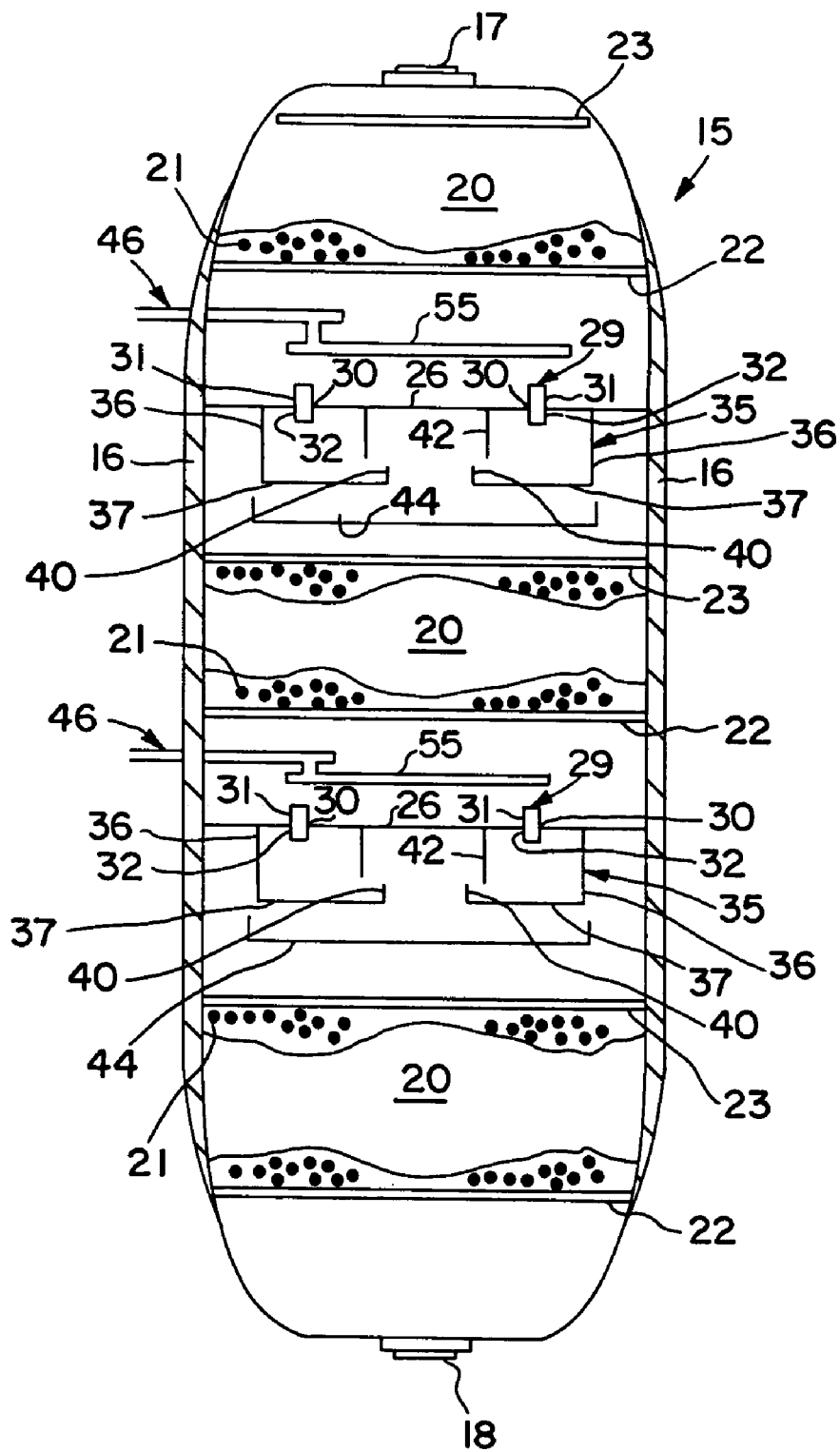
FIG. 1 is a schematic, side-elevational view of a reactor column, shown in cross section.

FIG. 1 shows, in simplified form, a hydroprocessing reactor column in accordance with the present invention. The general configuration of the reactor is conventional, as are details such as the supports for the grids and distributor plates which are not shown for purposes of clarity. The reactor column 15 is formed as a generally cylindrical chamber having an outer wall 16. A reactor inlet 17 and a reactor outlet 18 are provided for introducing and discharging fluids from the reactor column 15. The reactor column 15 further comprises one or more catalyst beds 20 positioned along the longitudinal axis of the reactor column 15. Each of the catalyst beds 20 contains catalyst material 21 which is preferably supported below by a catalyst support grid 22. The catalyst support grid 22, together with the outer wall 16, provides direct support for the catalyst material 21. Alternatively, the catalyst support grid 22 may provide indirect support for the catalyst 21 by retaining one or more layers of a larger supporting solid or solids which in turn support the catalyst 21. A distribution tray 23, for facilitating even distribution of fluids over the catalyst 21, is preferably provided above the catalyst material 21.

The catalyst support grids 22 and the distribution trays 23 comprise meshed or perforated portions having openings sufficiently large to allow fluids to pass therethrough. In addition, the openings in the catalyst support grids 22 are sufficiently small so as to prevent the catalyst 21 from passing through. Further, it will be appreciated that the openings in the distribution trays 23, and any flow devices which may be associated with the openings in the distribution trays 23, should be sized and spaced such that fluids deposited onto the distribution tray 23 are generally forced to spread substantially over the distribution tray 23 before passing through distribution tray 23.

The spaces between successive catalyst beds define interbed mixing zones. The interbed mixing zones function, in part, to provide a homogeneous mixture of reactants to the catalyst beds 20. Additionally, the interbed mixing zones provide a convenient position for introducing quench fluids and/or supplemental reactants into reactor column 15. Although the embodiment shown in FIG. 1 contains three catalyst beds 20 and two interbed mixing zones, it will be appreciated by those skilled in the art that the reactor in accordance with the present invention may contain more or less than three catalyst beds and more or less than two interbed mixing zones.

A mixing system is positioned within at least one of the interbed mixing zones. The mixing system comprises a collection tray 26 which extends generally perpendicular to a longitudinal axis of reactor column 15. Collection tray 26 spans substantially across the entire diameter of reactor column 15 so as to divide the interbed mixing zone into an upper and a lower region. Accordingly, collection tray 26 collects fluids passing through the catalyst bed 20 which is positioned above collection tray 26.

One or more passageways 29 are provided in collection tray 26 to provide fluid communication between the upper and lower regions of the interbed mixing zone. Accordingly, the passageways 29 permit vapor and/or liquid phases collected above the collection tray 26 to flow downwardly into the lower region of the interbed mixing zone. In the embodiment shown, each collection tray 26 comprises two passageways 29 formed as spillways. Each of the spillways is formed as an opening 30 within the collection tray 26. A first conduit 31 is formed above the opening 30 for directing fluids through opening 30 and a second conduit 32 is formed beneath opening 30 for directing fluids that have passed through opening 30 away from opening 30. It will, however, be appreciated by those of skill in the art that other designs may be utilized. For example, the passageways may comprise open-ended tubes passing through collection tray 26.

Mixing chamber 35 is positioned below collection tray 26 to receive fluids which pass through passageways 29. In the embodiment shown in FIG. 1, the mixing chamber comprises a cylindrical wall 36 attached to, and extending generally perpendicular away from a lower surface of collection tray 26. Mixing chamber 35 further comprises floor 37, extending generally horizontally from cylindrical wall 36 upon which fluid can collect. Weir 40 is positioned generally peripherally at the end of floor 37 as a retaining wall extending perpendicularly and upwardly from floor 37 of mixing chamber 35. Fluids must therefore flow over weir 40 prior to exiting mixing chamber 35. Accordingly, weir 40 functions to retain fluid on the floor 37 of mixing chamber 35 until the level of fluid on floor 37 is about the same as, or higher than the height of weir 40.

Flash pan 44 is optionally positioned within the interbed mixing zone below mixing chamber 35. Flash pan 44 comprises a floor with a retaining wall extending substantially vertically upward about the perimeter of the floor. Flash pan 44 also optionally comprises openings or upstanding pipes to convey fluid through the floor of flash pan 44. Flash pan 44 may be provided to receive fluids as they are discharged from mixing chamber 35 so as to evenly distribute the fluids over the surface of distribution tray 23.

In addition, one or more quench feed lines 46 extend through the wall 16 of reactor column 15 into one or more quench injectors 55 within the interbed mixing zones. Injectors 55 enable a fluid to be injected into one or more of the interbed mixing zones. Quench feed lines 46 may also enter through the top or bottom head of reactor column 15 and pass through catalyst beds 20 and distribution trays 23 to arrive at an injector 55 within the interbed mixing zone. For example, in a hydroprocessing reactor, hydrogen may be injected as both a quench fluid and as a reactant. In general the quench fluid may be a gas, a liquid or a mixture of gas and liquid. Injectors 55 should provide a uniform, initial distribution of the quench fluid as further described herein.

Although not required in connection with the present invention, FIG. 1 further shows a baffle 42 within mixing chamber 35. As described in applicant's co-pending patent application entitled "IMPROVED MULTIPHASE MIXING DEVICE WITH BAFFLES," which is hereby incorporated by reference, baffle 42 facilitates the mixing of fluids within mixing chamber 35. In FIG. 1, baffle 42 extends perpendicularly and downwardly from the bottom of collection tray 26.

Figure 2:
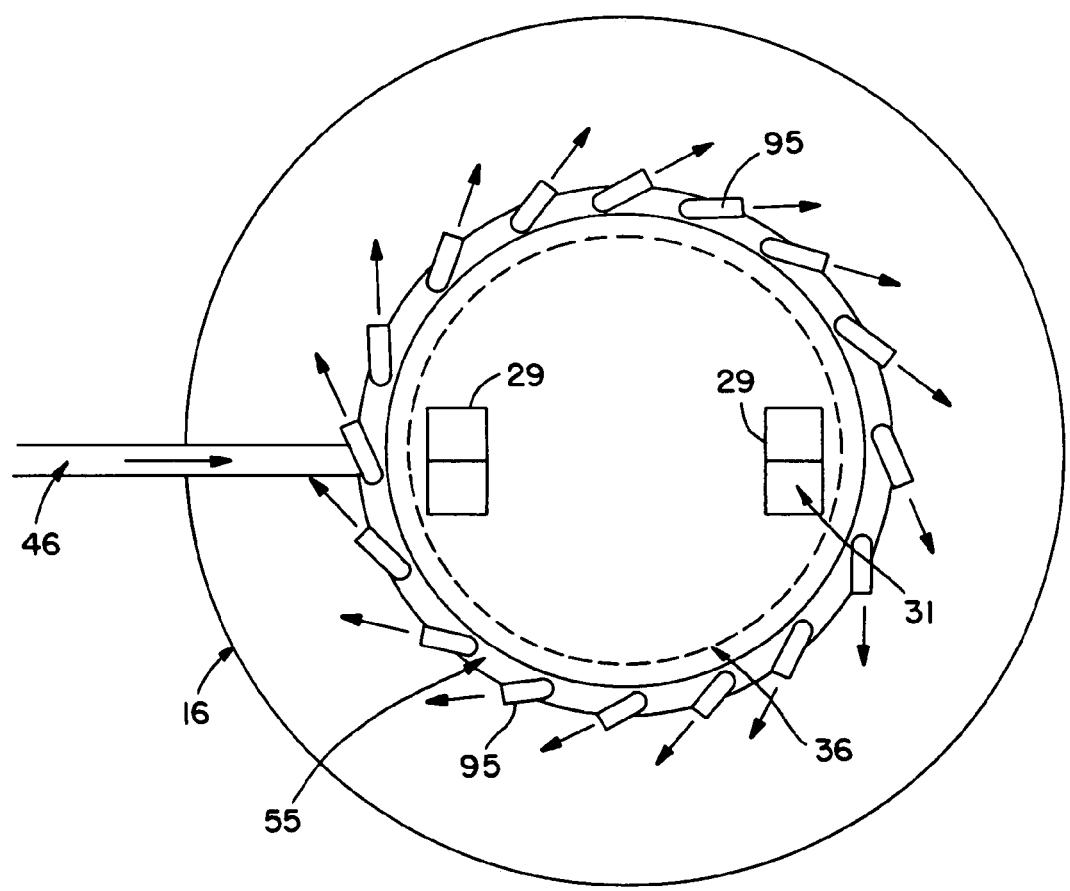
FIG. 2 is a plan view of the mixing system of the present invention illustrating the structure and location of the quench injector according to the teachings herein.
Figure 3:
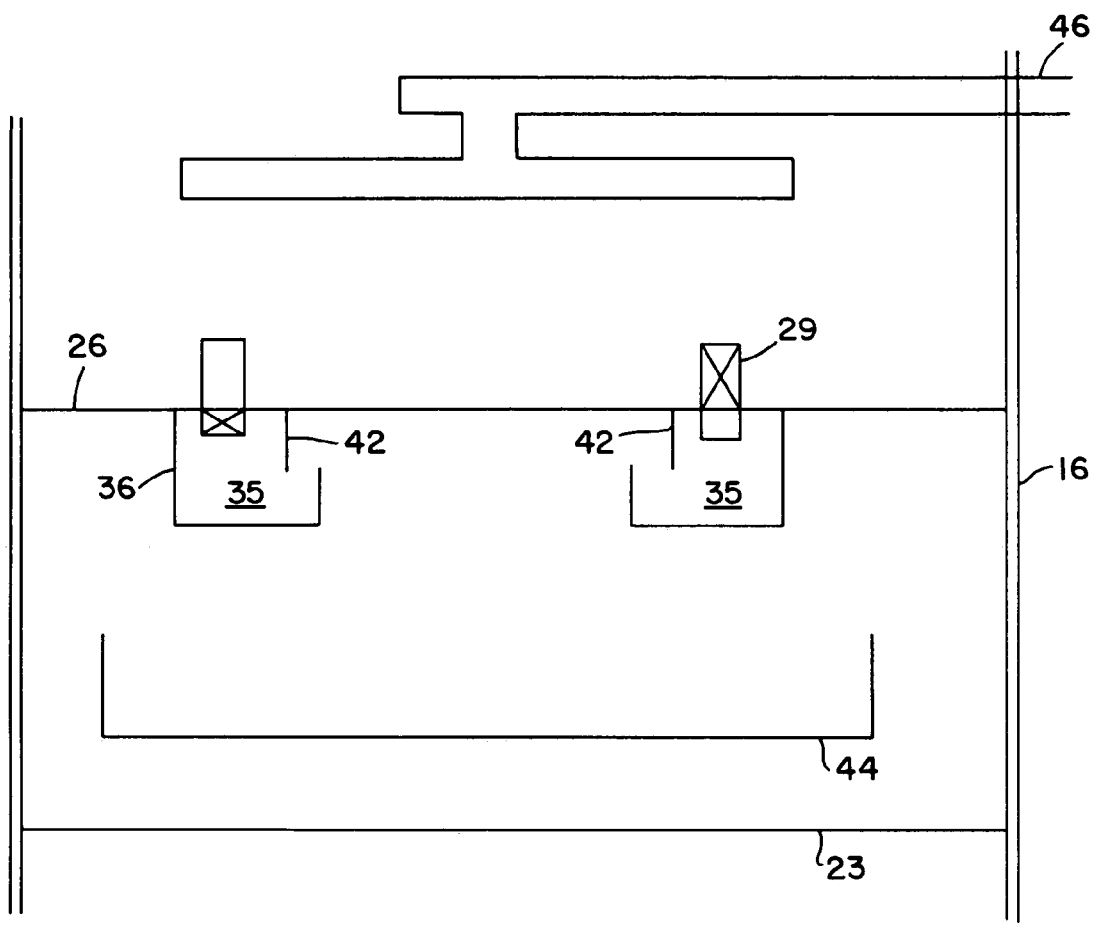
FIG. 3 is an elevation view of the mixing system of the present invention illustrating the structure and location of the quench injector according to the teachings herein.

According to the specific teachings of the present invention, quench fluid mixing is significantly improved by a novel means of quench introduction within reactor column 15. As shown in FIGS. 2 and 3, quench injection is configured so as to cause a rotational current on collection tray 26. This, in turn, provides fluid mixing which is highly complementary to the rotational flows induced within the mixing chamber 35 below collection tray 26.

In particular, because various structures such as baffles, ramps and surfaces located on collection tray 26 are present in most, if not all downflow reactors, and because these structures tend to change fluid flow from an approximately radial trajectory to a circular motion similar to that desired within mixing chamber 35, it is beneficial for quench injection to be accomplished so as to include a significant angular velocity component as taught herein. In the exemplary embodiment shown in FIG. 1, conduit 31 is one such structure on collection tray 26 that tends to cause rotational fluid flow as fluid passes through the opening 30 in collection tray 26 and into the mixing chamber 35.

The teachings herein are based upon an understanding that the injection of quench fluid in a direction that provides a significant angular velocity component has two benefits. First, premixing of fluids of like phase on collection tray 26 is greatly improved due to currents set up via rotational flow of injected quench. Second, rotational momentum which prevails in the mixing chamber 35 is increased by providing entering fluids with some angular velocity before they encounter the baffles, surfaces or ramps leading into mixing chamber 35. Both benefits lead to better overall mixing performance in the quench zone.

Referring now specifically to FIGS. 2 and 3, the structure of the quench injection means of the present invention is described. Quench fluid is provided to reactor 15 via quench fluid inlet line 46. Quench fluid inlet line 46 is connected with quench injector ring 55 so that quench fluid flows from inlet line 46 directly into quench injector ring 55. Quench injector ring 55 contains a number of quench outlets 95 through which quench fluid may exit quench injector ring 55 and enter reactor 15 above collection tray 26. In one embodiment of the present invention, quench outlets 95 comprise a plurality of small pipes leading out the top of quench injector ring 55, each pipe having a 90-degree bend from vertical to horizontal and a short straight length (still as pipe) to direct the flow in a swirl. As will be apparent to one of skill in the art, pipes may be bent in angles which vary to some degree from 90 degrees so long as rotational flow is induced in the horizontal plane as taught herein. In one embodiment of the invention, quench injector ring 55 includes twenty pipes evenly spaced around quench injector ring 55.

Of course, the use of some other number of pipes and some other type of spacing between pipes is possible while remaining within the scope and spirit of the present invention. Additionally, various other arrangements are possible in connection with the means for permitting quench fluid to exit quench injector ring 55. For example, open holes on the top of quench injector ring 55 with hoods above to direct the flow from each hole in a direction promoting rotation, may also be employed as an alternative embodiment. The exits for quench to escape quench injector ring 55 may also be located at various points on quench injector ring 55 such as, for example, on the bottom of the ring or the outside or inside of the ring, so long as the last section of conduit proceeding from each injection point directs the quench flows in a swirl. Notwithstanding the various configurations that are possible for allowing fluid to exit quench injector ring 55, it is preferable to ensure that flow rates at all exits are as similar as possible.

It is preferred, but not essential, that the individual quench flows be directed horizontally within the reactor as opposed to in a direction which is not parallel to the plane of quench injector ring 55. Angles from 0 to 30 degrees with respect to such plane will allow significant rotational momentum to be generated. Angles exceeding 30 degrees with respect to such plane are less desirable because a significant fraction of the quench fluid momentum is not imparted as an angular momentum to the fluid on and above the collection tray 26, as well as due to risk of unfavorable impingement of the quench jets on the catalyst support grid, collection tray, and/or other internal member(s). The injected quench fluid velocity should be as high as practical to induce the most substantial current possible above the collection tray, while not exceeding relevant limits designed to avoid quench injector wear, jet impingement on internal surfaces, vibration or other detrimental mechanical phenomena.

Figure 4:
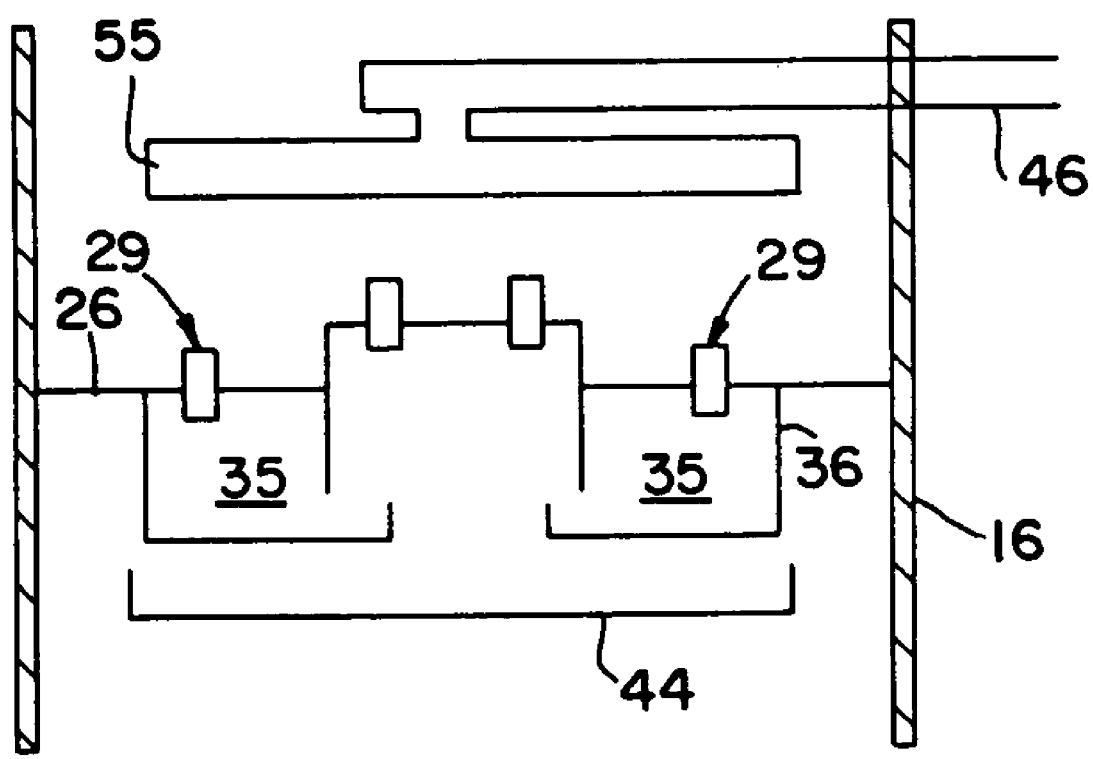
FIG. 4 is an elevation view of the mixing system of the present invention according to a second embodiment in which a secondary swirl chamber is employed.

According to the teachings of the present invention, the swirl flow induced by the quench injectors favorably complements the swirl entrance flow to the principal mixing chamber. Referring to FIG. 3, the swirl entrances are the spillways leading into the principal mixing chamber. In quench zone designs which include additional swirl entrances or devices, such as those described in applicant's co-pending application "IMPROVED MULTIPHASE MIXING DEVICE WITH STAGED GAS INTRODUCTION" (application Ser. No. 10/358,760, filed on Feb. 5, 2003) and shown schematically in FIG. 4, the swirl flow induced by the quench injectors also favorably complements the entrance flow to the secondary swirl chamber or device, provided these additional swirl devices produce rotation in the same direction as that in the principal mixing chamber. As such, the invention would give a disproportionate improvement in mixing efficiency when applied in quench zones having multiple swirl devices.

The teachings of the present invention may be combined with the teachings of applicant's co-pending application entitled "MULTIPHASE MIXING DEVICE WITH IMPROVED QUENCH INJECTION" the complete specification of which is incorporated by reference herein. According to the teachings in that application, one or more quench injection points are selected such that (i) the accompanying lateral velocities of process fluids in the region are low, (ii) sufficient volume is available for the quench fluid to mix with the process fluids, and (iii) the quench is introduced with a velocity which is principally opposed to that of the process fluid transverse velocity. By identifying where process fluids pass through the collection tray 26, and by examining the paths that process fluids travel as they approach the openings in collection tray 26, the best location for the associated injector(s) can be determined in accordance with the teachings herein. In most existing downflow reactors, the openings in the collection tray 26 are at or near the center of reactor 15. In such cases, process fluids exiting downward through the catalyst support grid must travel generally horizontally along or above collection tray 26 toward the openings in collection tray 26. Further, if the space above the collection tray 26 is mostly empty volume free of obstructions, then the flow paths will proceed directly toward the openings. In cases where baffles are present on the upper surface of collection tray 26, the flow paths will proceed toward the openings by a more indirect route defined by the baffles.

Depending upon where the process fluid flow paths fall, according to the first and third criteria of the invention described in the aforementioned co-pending application, quench is injected where the process fluids are traveling at a low relative velocity and such that the quench is injected in a direction opposite that of the process fluid flow. In general, this dictates that quench be injected nearer to the wall 16 of reactor 15 and in an outward direction. However, it is also preferable according to the second criteria of that invention to ensure adequate mixing space between the injection point(s) and the reactor wall 16 in order to maximize mixing efficiency.

The teachings described above with respect to the present invention result in an injection system in which a coherent reactor-wide swirl flow is created. This flow must be compatible with the swirl induced by the principal mixing devices (spillways or swirl vanes) that lead into the mixing chamber 35, in order to create a premixing step. That is, if the spillways, swirl vanes, or other entrances to the principal mixing chamber induce a clockwise rotational flow, then the present invention teaches that the quench injectors be directed to induce a clockwise rotational flow in the space above and on the collection tray 26. If the swirl in the principal mixing chamber is counterclockwise, then the quench injectors must induce a counterclockwise current. The placement of injection points in the form described herein is consistent with the teachings of the aforementioned co-pending patent application, as quench injection ring 55 is in a region of low transverse velocity but still leaves mixing space between itself and the reactor outer wall 16, and injects somewhat opposed to the transverse (radial inward) process flow. In a preferred embodiment of the present invention, and although it is otherwise preferable to inject quench in a direction fully (180 degrees) opposed to the transverse process fluid flow, it is preferred to inject at an angle from approximately 120 to 135 degrees relative to the radial direction, which is also the prevailing direction of transverse process fluid flow, in order to obtain the disproportionate benefit of pre-swirling above collection tray 26.

According to the teachings of the present invention as combined with the teachings contained in the above-referenced co-pending application, the process for determining the optimal location for injection points and providing optimal quench flow patterns may also be applied to interbed systems wherein substantially vertical baffles on the upper surface of collection tray 26 prevent process fluid from following a direct radial path to the openings in collection tray 26, provided these baffles do not extend so high as to preclude a coherent reactor-wide current from being induced. In the case of a spiral baffle as in, for example, the '896 patent cited above, fluid is forced to follow a longer path to a central opening, thereby increasing mean residence time on collection tray 26. As a result, extended contact between the fluids from different regions of reactor 15 is attained. If there is sufficient space between the underside of the catalyst support grid and the top of the spiral baffle, the teachings of the present invention may be employed to design a quench injection means in the intervening space which creates a swirl flow in the same direction as the flow induced by the spiral baffle, enhancing the mixing efficiency of the quench zone.

The above discussion of the present invention describes the optimal placement of quench inlets so as to provide injection at the optimal locations and in the optimal directions. However, it will be understood by one of skill in the art that the teachings of the present invention are not limited thereto and the present invention may be applied to applications in which any connecting means is used to connect one or several entrance conduits to a plurality of inlets thus located. The teachings of the present invention do not require that the connecting means be symmetric or disposed in any particular manner, except for the consideration, which will be obvious to one of skill in the art, that substantially equal quench flows from each of the inlets is preferred.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims, and by their equivalents.

What is claimed is:

1. A mixing system for distributing vapor and liquid across a reactor, comprising:
    (a) a reactor vessel defined by a reactor wall;
    (b) a collection tray for receiving vapor and liquid;
    (c) at least one mixing chamber below said collection tray; and
    (d) at least one quench injector for introducing quench fluid into said mixing system at a location above said collection tray,
    wherein said at least one quench injector comprising a plurality of quench fluid outlets for inducing a rotational flow component associated with said quench fluid,
    wherein said plurality of quench fluid outlets being arranged to direct said quench fluid in an outwardly direction away from a longitudinal axis of said reactor vessel.

2. The mixing system of claim 1 wherein said rotational flow component associated with said quench fluid is in a plane substantially perpendicular to the longitudinal axis of said reactor vessel.

3. The mixing system of claim 2 wherein said at least one quench injector comprises a quench injector ring.

4. The mixing system of claim 3 wherein said quench injector ring is circular.

5. The mixing system of claim 3 wherein said quench injector ring comprises the same geometric shape as the cross-sectional geometric shape of said reactor vessel in said plane.

6. The mixing system of claim 1 wherein the rotational direction of said quench fluid is the same as the rotational direction induced by the principal mixing devices leading into said mixing chamber.

7. The mixing system of claim 1 wherein the quench fluid is injected in a direction which is opposite that of the transverse process fluid flow.

8. The mixing system of claim 1 wherein said mixing system further comprises at least one vertical baffle located below said collection tray.

9. A mixing system for distributing vapor and liquid across a reactor, comprising:
   a reactor vessel defined by reactor wall;
   a collection tray for receiving vapor and liquid;
   at least one mixing chamber below said collection tray; and
   at least one quench injector for introducing quench fluid into said mixing system at a location above said collection tray,
   wherein said at least one quench injector comprising a quench injector ring having a plurality of quench fluid outlets for inducing a rotational flow component associated with said quench fluid,
   wherein said rotational flow component associated with said quench fluid is in a plane substantially perpendicular to the longitudinal axis of said reactor vessel,
   wherein said quench fluid outlets comprise a plurality of pipes exiting from the top of said quench injector ring.

10. The mixing system of claim 9 wherein said pipes contain at least one bend and wherein said pipes terminate substantially parallel to said plane.

11. The mixing system according to claim 9, wherein said plurality of pipes comprises twenty pipes, wherein each pipe containing a quench fluid outlet and wherein said pipes are evenly spaced around said quench injector ring.

12. The mixing system of claim 1 wherein said quench fluid outlets comprise a plurality of apertures located at various points on said quench injector.

13. The mixing system of claim 12 wherein said apertures are located around the top of said quench injector.

14. The mixing system of claim 1 wherein collective quench fluid is injected in a swirling motion.

15. The mixing system of claim 1 wherein quench fluid is injected horizontally within said reactor vessel.

16. The mixing system of claim 1 further comprising a secondary mixing chamber.

17. The mixing system of claim 10 wherein each of said pipes terminate in a direction which forms an angle with said plane of less than 30 degrees.

* * * * *